United States Patent [19]

Terada et al.

[11] Patent Number: 4,941,084

[45] Date of Patent: Jul. 10, 1990

[54] SYSTEM FOR LOCATING RESOURCES RESIDED IN A DISTRIBUTING PROCESSING SYSTEM BY SEQUENTIALLY TRANSMITTING RESOURCE INQUIRIES THROUGH A LOOPED TRANSMISSION LINE

[75] Inventors: Matsuaki Terada, Machida; Hiroshi Wataya, Hitachi; Satoru Takagi, Kawasaki; Masao Sueki, Hitachi, all of Japan

[73] Assignee: Hitachi, Ltd., Tokyo, Japan

[21] Appl. No.: 201,290

[22] Filed: May 27, 1988

Related U.S. Application Data

[63] Continuation of Ser. No. 766,196, Aug. 16, 1985, abandoned.

[30] Foreign Application Priority Data

Sep. 14, 1984 [JP] Japan .................................. 59-191555

[51] Int. Cl.$^5$ ........................ G06F 15/16; G06F 13/38
[52] U.S. Cl. ................................ 364/200; 364/229.3; 364/241.1; 364/259.2; 364/284.3; 340/825.07; 340/825.52
[58] Field of Search ... 364/200 MS File, 900 MS File; 340/825.07, 825.52, 825.05; 370/60, 82, 94

[56] References Cited

U.S. PATENT DOCUMENTS

| | | | |
|---|---|---|---|
| 3,771,137 | 11/1973 | Barner et al. | 364/200 |
| 4,366,479 | 12/1982 | Mori et al. | 340/825.05 |
| 4,423,414 | 12/1983 | Bryant et al. | 340/825.07 |
| 4,510,492 | 4/1985 | Mori et al. | 340/825.05 |
| 4,635,189 | 1/1987 | Kendall | 364/200 |
| 4,644,468 | 2/1987 | Doster et al. | 364/200 |
| 4,644,470 | 2/1987 | Feigenbaum et al. | 364/200 |
| 4,648,061 | 3/1987 | Foster | 364/900 |
| 4,754,395 | 6/1988 | Weisshaar et al. | 364/200 |

*Primary Examiner*—Thomas C. Lee
*Attorney, Agent, or Firm*—Antonelli, Terry, Stout & Kraus

[57] ABSTRACT

A resource management system and method in a distributed processing system in which a plurality of computers are interconnected through a transmission line. A computer makes, upon accessing to a resource of another computer, inquiries about "Whether the intended resource exists" and "Ordering that if the intended resource exists, the interrogated computer should return a response indicative of attribute information of that resource" by using a so-called broadcasting function to simultaneously apprize all the computers constituting the distributed processing system of the same message.

5 Claims, 5 Drawing Sheets

SYSTEM FOR LOCATING RESOURCES RESIDED IN A DISTRIBUTING PROCESSING SYSTEM BY SEQUENTIALLY TRANSMITTING RESOURCE INQUIRIES THROUGH A LOOPED TRANSMISSION LINE

This application is a continuation of application Ser. No. 766,196, filed Aug. 16, 1985.

BACKGROUND OF THE INVENTION

This invention relates to a distributed processing system in which a plurality of computers are interconnected through a communication system and more particularly to a resource management system suitable for allowing the computers to share resources.

In a conventional distributed processing system, each computer has a configuration table indicative of what resources the other computers have. When a computer does not have a resource required for its own sake, this computer examines the configuration table and requests another computer having the requisite resource to allow the utilization of this resource.

However, it is usual in the distributed processing system to add or withdraw a computer or computers as necessary, and the configuration table owned by each computer must be changed each time the computer installation is changed.

SUMMARY OF THE INVENTION

An object of this invention is to provide a resource management system in a distributed processing system which is able to keep a configuration table of each computer unchanged even when addition or withdrawal of a computer or computers occurs.

To accomplish the above object, according to this invention, a computer makes, upon accessing to a resource of another computer, inquiries of the other computers constituting the distributed processing system about "Whether the intended resource exists" and "Ordering that if the intended resource exists, the interrogated computer should return a response indicative of attribute information of that resource". Advantageously, this construction allows each computer to manage only resources of its own and to retire from storing locations of resources existent in the other computers, and therefore there is no need of changing network configuration tables of the other computers even when the system construction is changed.

DESCRIPTION OF THE PREFERRED EMBODIMENTS

The invention will now be described by way of example with reference to the accompanying drawings.

Figure 1:
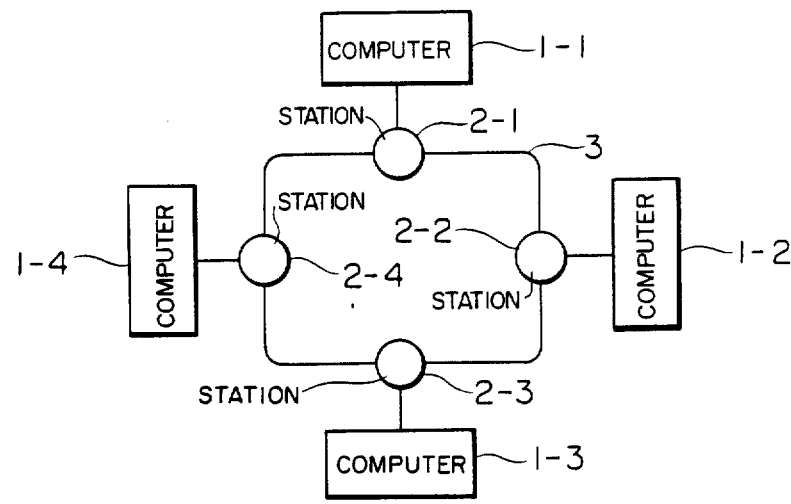
FIG. 1 is a block diagram showing the construction of an embodiment of an in-house or local area distributed processing system to which the invention is applied.

FIG. 1 shows schematically an in-house distributed processing system to which the invention is applied. The system comprises computers 1-1, 1-2, 1-3 and 1-4, stations 2-1, 2-2, 2-3 and 2-4 respectively associated with the computers, and a transmission line 3 interconnecting the stations.

A message sent from a station is sequentially relayed by another station to propagate along the transmission line. The message transmission along the transmission line 3 is always unidirectional. When the message arrives at a destination station, this station fetches the message. In this manner, communications are effected between the stations.

Figure 2:
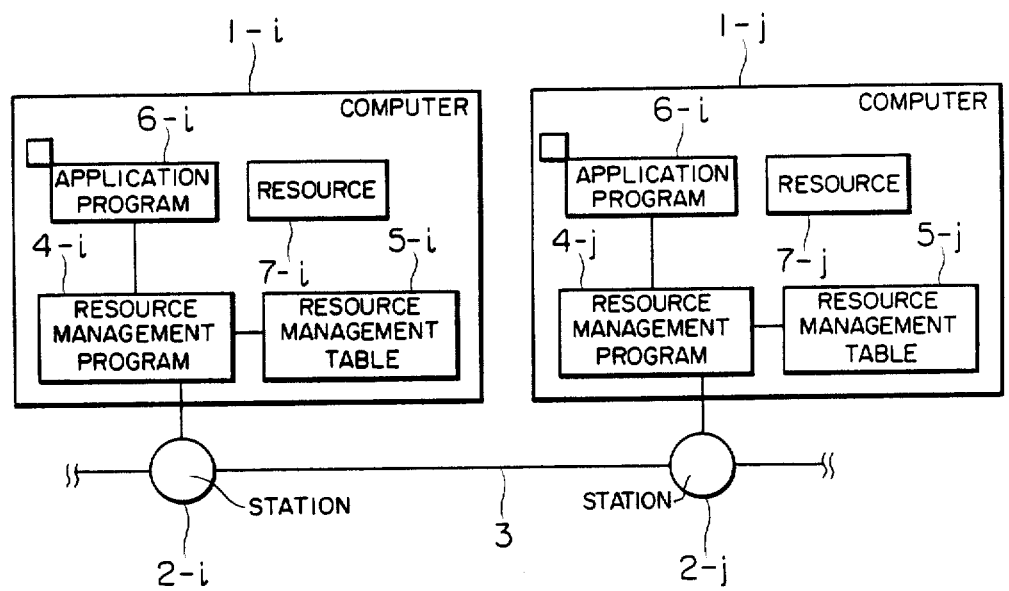
FIG. 2 is a block diagram showing the construction of a resource management system according to an embodiment of the invention.

Taking a computer 1-$i$ and another computer 1-$j$ included in the in-house distributed system into account, their constructions are diagrammatically shown in FIG. 2.

As shown, the computer 1-$i$ includes a resource management program 4-$i$, a resource management table 5-$i$, and an application program 6-$i$ used for requesting the utilization of a resource 7-$i$. The resource 7-$i$ is constituted with at least one of units such as data, an input-/output unit and a program. Likewise, the computer 1-$j$ includes a resource management program 4-$j$, a resource management table 5-$j$, an application program 6-$j$ and a resource 7-$j$.

Figure 3:
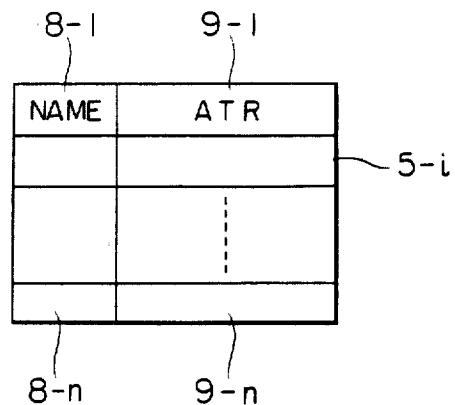
FIG. 3 shows a format of a resource management table according to the embodiment.

The resource management table 5-$i$ or 5-$j$ has a format as shown in FIG. 3. The format consists of entries 8-1 to 8-$n$ holding names of resources and entries 9-$l$ to 9-$n$ holding pieces of attribute information of the resources.

The names of resources are uniquely or definitely assigned to the respective resources included in the in-house distributed processing system, and the application program 6-$i$ accesses the resources by their names.

The attribute information of a resource is indicative of kind and location of the resource. Taking a printer as a resource, for instance, the printer is categorized by the kind of resource into one dedicated to Chinese character use or one dedicated to alphabetical character use. The location of a resource indicates which computer the resource belongs to or what physical number the resource has.

Since, in this embodiment, the computer is associated with the station in one-to-one correspondence relationship, designation of the location of a resource directly results in designation of the corresponding station. But the invention is not limited to this association and a single computer may be connected to a plurality of stations. In this case, it will be obvious to those skilled in the art that the attribute information further includes a data indicative of which station belongs to the single computer. Conversely, a plurality of computers may be associated with a single station in a similar manner.

In the respective resource management tables 5-$i$ and 5-$j$, only resources present in the respective computers 1-$i$ and 1-$j$ are enrolled.

Figure 4:
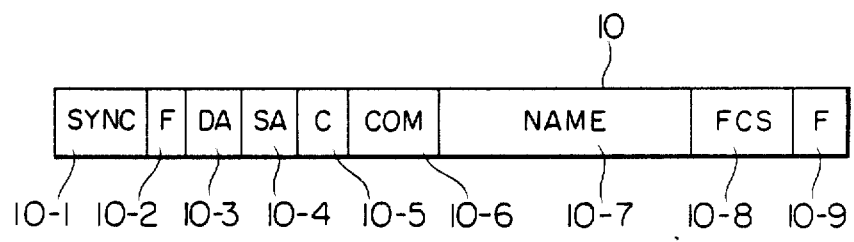
FIG. 4 shows a format of an inquiry frame according to the embodiment.

FIG. 4 illustrates a format of an inquiry frame 10 sent from the computer 1-$i$ to all the computers inclusive of the computer 1-$j$ shown in FIG. 2 through the transmission line 3.

The format of the frame 10 consists of a special pattern (SYNC) 10-1 for synchronization of the transmission line, additional special patterns (F) 10-2 and 10-9, respectively, indicative of the beginning and end of the frame, an address (DA) 10-3 of a destination station 2-j for which the inquiry is destined, a source address (SA) 10-4 of a station 2-i, a control byte (C) 10-5 for various types of controlling, an inquiry command (COM) 10-6, a name of a resource (NAME) 10-7 to be inquired, and a frame check sequence (FCS) 10-8 for detection of errors.

The DA 10-3 of the inquiry frame 10 is set to a specified bit pattern (typically all "1") so as to make the broadcasting valid wherein the inquiry frame 10 is received by all of the remaining stations. This bit patterning is of course for illustrative purposes only and the bit patterning for the broadcasting is not limited thereto.

Figure 5:
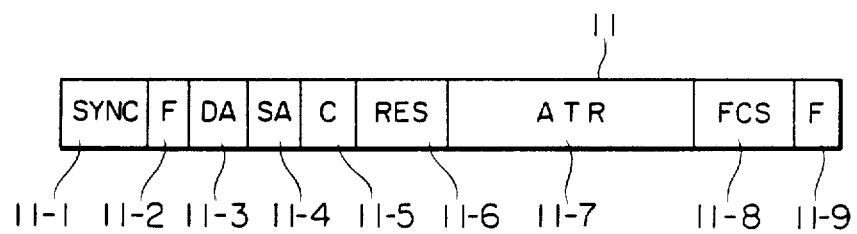
FIG. 5 shows a format of a response frame according to the embodiment.

If the computer 1-j has a resource corresponding to the NAME 10-7 designated by the inquiry frame 10, the computer 1-j sends to the transmission line 3 a response frame 11 having a format as shown in FIG. 5.

Thus, the interrogated computer 1-j returns the response frame 11 of the FIG. 5 format having a special pattern (SYNC) 11-1, additional special patterns (F) 11-2 and 11-9, a source address (SA) 11-4, a control byte (C) 11-5 and a frame check sequence (FCS) 11-8 which are the same as those of the inquiry frame format, and the other bytes 11-3, 11-6 and 11-7 which are characteristic of the response frame.

More specifically, the destination address (DA) 11-3 has, unlike the inquiry frame 10, an address of the source station 2-i which transmits the inquiry frame 10. The response (RES) 11-6 indicates that this frame 11 is a response frame, and the attribute information (ATR) 11-7 is for a resource subject to the inquiry.

Figure 6:
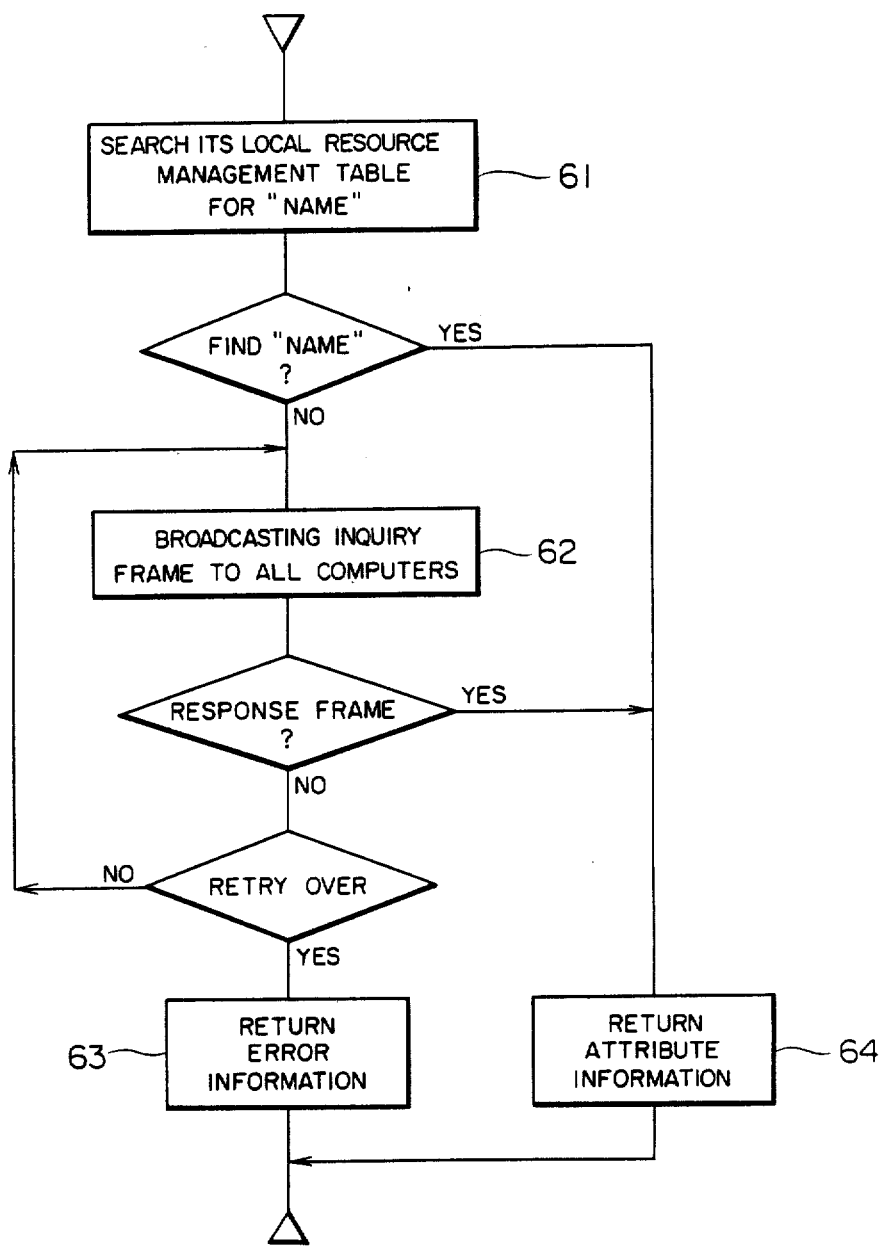
FIG. 6 is a flow chart showing an inquiry operation according to the embodiment.
Figure 7:
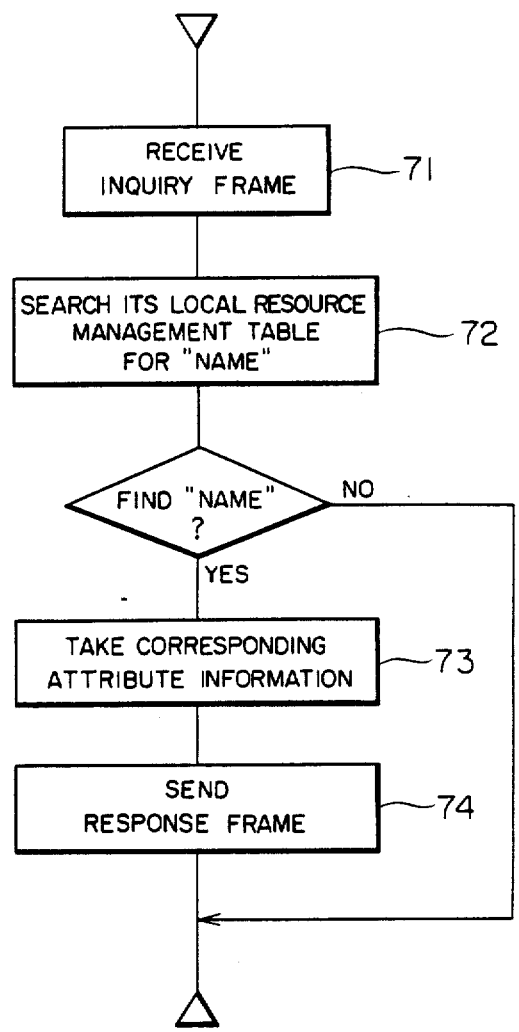
FIG. 7 is a flow chart showing a response operation according to the embodiment.

The inquiry operation of the resource management program 4-i is exemplified in a flow chart of FIG. 6, and the inquiry reception operation of the resource management program 4-j is exemplified in a flow chart of FIG. 7.

The inquiry and inquiry reception operations of these resource management programs will now be described in greater detail with reference to FIGS. 6 and 7, respectively.

Inquiry Operation (See FIG. 6)

The resource management program 4-i of the computer 1-i receives a resource access request from the application program 6-i and initiates an inquiry operation.

The application program 6-i then transfers a name (NAME) of a resource to be accessed to the resource management program 4-i. The resource management program 4-i searches the resource management table 5-i for the NAME to examine the presence or absence of the NAME (step 61). If the NAME exists, the corresponding attribute information is read out and returned to the application program 6-i.

If the NAME is not in the resource management table 5-i, the inquiry frame 10 is prepared and sent through broadcasting to all the computers inclusive of the computer 1-j, bringing about a condition ready for reception of the response frame (step 62).

If the resource designated by the NAME exists in the computer 1-j, the response frame 11 is returned from the computer 1-j. If there is no response frame returning from any of the remaining computers inclusive of the computer 1-j, the inquiry frame 10 is retransmitted. If no response frame occurs even when the inquiry frame 10 is retransmitted m times, the application program 6-i is informed of the fact that the accessing to the resource is invalid (step 63).

When the response frame 11 is returned, the attribute information (ATR) 11-7 is taken out and the application program 6-i is apprised of the ATR (step 64).

The application program 6-i actually accesses the resource by using the attribute information thus obtained. More particularly, the application program 6-i designates a destination station and delivers the attribute information of the resource and the access request to the station 2-i. This station 2-i sends a frame inclusive of the attribute information and access request to the designated station.

Inquiry Reception Operation (See FIG. 7)

When the resource management program 4-j included in the computer 1-j receives the inquiry frame 10 from the computer 1-i (step 71), an inquiry reception operation is initiated.

The resource management program 4-j takes the NAME 10-7 out of the received inquiry frame 10 and by referring to the resource management table 5-j, examines whether an entry having the NAME exists (step 72). If it exists, the attribute information is taken out (step 73), and the response frame 11 is prepared and transmitted to the source computer 1-i which has originated the inquiry frame 10 (step 74).

If the NAME is not in the resource management table 5-j, the response frame 11 is not prepared and returned.

Figure 8A:
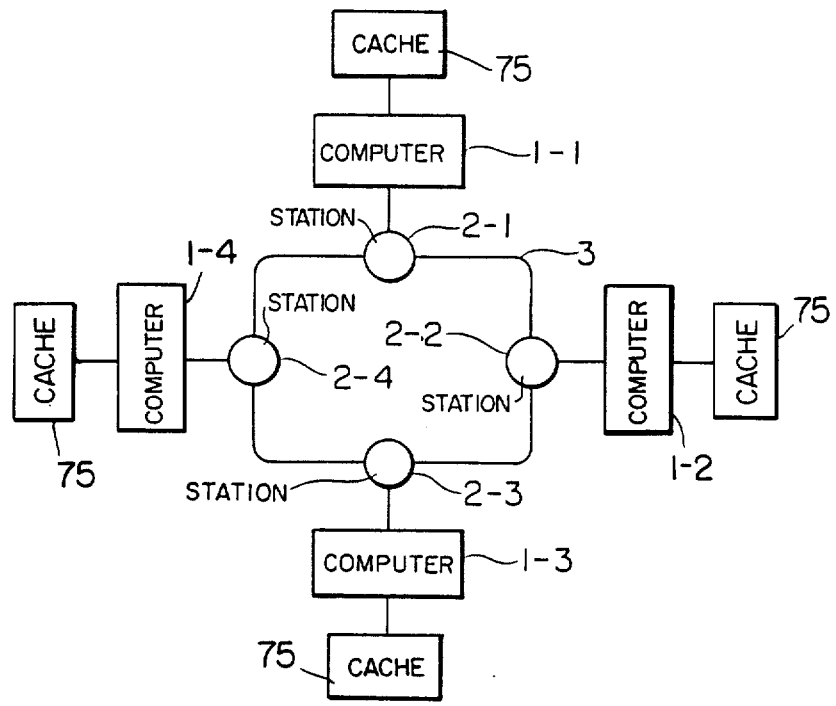
FIGS. 8a-8b are block diagrams of other embodiments of the present invention.
Figure 8B:
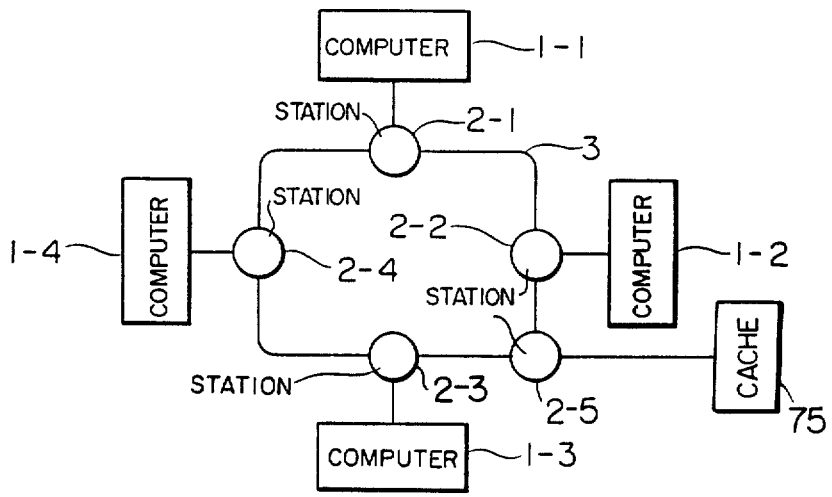

The present invention is not limited to the foregoing embodiment but it may be modified as follows and shown in FIGS. 8a and 8b.

(1) In the foregoing embodiment, when the resource management table 5-i does not have the requested NAME, the inquiry frame is immediately issued. In order to decrease the overhead of the inquiry, however, a cache table 75 may preferably be provided.

With the cache table 75, a pair of NAME and attribute information obtained as a result of one inquiry is enrolled in the cache table 75 having a similar format to that of FIG. 3.

Upon initiation of an inquiry operation, the cache table is first referred to prior to the transmission of the inquiry frame 10 through broadcasting so as to examine whether the attribute information has already been acquired. If acquired, the attribute information is returned to the application program 6-i and the inquiry through broadcasting is omitted.

When addition or withdrawal of a computer or computers occurs, the registered contents of the cache table 75 are purged.

Advantageously, this ensures, that the system construction remains unchanged, that once the broadcasting communication is initially performed, the same resource can be utilized repetitiously.

(2) The communication system is not limited to a data system but instead, it may be of a packet exchange network or a satellite communication.

(3) The distributed processing system is not limited to the in-house system but instead, it may be of a broad area distributed processing system.

(4) This invention can be implemented efficiently by making inquiries through the broadcasting. But the respective computers may be interrogated separately without resort to the broadcasting.

As described above, since according to the invention the respective computers constituting the distributed processing system are simply required to have the local configuration table regarding the resource of the respective computers and its own configuration table need not be changed even when the number of the computers and the number of the resources involved in the system are changed, the distributed processing system can be changed or extended with ease.

We claim:

1. A resource management system in a distributed processing system, said management system comprising:
   a plurality of arithmetic processing means;
   at least one resource belonging to each arithmetic processing means;
   a unidirectional looped transmission line interconnecting said plurality of arithmetic processing means for exchanging information therebetween; and
   storage means provided in each of said plurality of arithmetic processing means, for storing a resource management table which registers an identification code and attribute information of a resource belonging to said arithmetic processing means, said attribute information including information for specifying a location of said resource; and
   a first one of said plurality of arithmetic processing means including means for effecting an inquiry through said transmission line, to all other arithmetic processing means to determine whether any one of said other arithmetic processing means contains a resource represented by an identification code desired by said first arithmetic processing means;
   wherein, said inquiry being performed by sending an inquiry request from said first one of said arithmetic processing means to a second arithmetic proceeding means of said other arithmetic processing means, determining by said second arithmetic processing means whether a resource requested by said inquiry request is contained therein, and if said requested resource is not contained in said second arithmetic processing means sequentially passing said inquiry request to each of said other arithmetic processing means until said requested resource is found; and
   wherein each of said other arithmetic processing means includes means for making reference to the resource management table contained therein to examine whether it contains the desired resource and means for effecting a response processing to transmit, through said transmission line, an identification code and attribute information of said desired resource to said first arithmetic processing means when said reference means detects said desired resource so that said first arithmetic processing means can access said desired resource by using said attribute information.

2. A resource management system according to claim 1, wherein said first arithmetic processing means further comprises a cache table in which said identification information and attribute information provided by one of said other arithmetic processing means are stored, said first arithmetic processing means including means for searching said cache table prior to effecting said inquiry processing and for omitting said inquiry processing when it is determined from a search of said cache table that said attribute information of said desired resource has already been stored in said cache table.

3. A resource management system according to claim 2, wherein the contents of said cache table are purged when said one of said other arithmetic processing means is withdrawn from said distributed processing system.

4. A resource management method in a network system having a plurality of stations interconnected through a transmission unidirectional looped line, each station being connected to a data processing means for managing at least one resource, comprising the steps of:
   broadcasting an inquiring message inquiring as to a location of a requested resource from a first one of said data processing means to said transmission line through a first station connected with said first data processing means when a request is made by an application program of said first data processing means to access a resource not under the management of said first data processing means;
   receiving said inquiring message within a data processing means of other data processing means connected to said transmission line;
   examining a resource management table included in said data processing means to determine whether the requested resource is under the management thereof;
   suquentially passing said inquiry message to other data processing means connected to said transmission line until said requested resource is found;
   sending a response message containing attribute information of said requested resource back to said first data processing means, from a second data processing means of said other data processing means, when said requested resource is determine to be under management of said second data processing means; and
   sending an accessing message for accessing said requested resource from said first data processing means to said second data processing means using said attribute information contained in said response message when a response message is sent from said second data processing means to said first data processing means.

5. A resource management method according to claim 4, wherein said attribute information contained in said response message includes physical identification information of said requested resource.

* * * * *